United States Patent
Zhang et al.

(10) Patent No.: US 8,923,565 B1
(45) Date of Patent: Dec. 30, 2014

(54) PARKED VEHICLE DETECTION BASED ON EDGE DETECTION

(71) Applicant: ChengDu HaiCun IP Technology LLC, ChengDu (CN)

(72) Inventors: Guobiao Zhang, Corvallis, OR (US); Yaofei Feng, Corvallis, OR (US); Bruce Bing Wang, ShangHai (CN)

(73) Assignees: ChengDu HaiCun IP Technology LLC, ChengDu, SiChuan (CN); Guobiao Zhang, Corvallis, OR (US)

( * ) Notice: Subject to any disclaimer, the term of this patent is extended or adjusted under 35 U.S.C. 154(b) by 0 days.

(21) Appl. No.: 14/147,578

(22) Filed: Jan. 5, 2014

Related U.S. Application Data

(60) Provisional application No. 61/883,122, filed on Sep. 26, 2013, provisional application No. 61/889,004, filed on Oct. 9, 2013.

(51) Int. Cl.
*G06K 9/00* (2006.01)
*G08G 1/14* (2006.01)
*G06T 7/00* (2006.01)

(52) U.S. Cl.
CPC .......... *G06K 9/00812* (2013.01); *G06T 7/0085* (2013.01)
USPC ...................................... 382/104; 340/932.2

(58) Field of Classification Search
CPC ..... G06K 9/00812; G08G 1/14; G08G 1/141; G08G 1/145; G08G 1/146; G08G 1/147

USPC ........ 382/104; 340/932.2, 937, 938; 348/113, 348/118, 116; 701/117, 118
See application file for complete search history.

(56) References Cited

U.S. PATENT DOCUMENTS

| | | | | |
|---|---|---|---|---|
| 6,285,297 | B1* | 9/2001 | Ball | 340/932.2 |
| 7,116,246 | B2* | 10/2006 | Winter et al. | 340/932.2 |
| 7,893,847 | B2* | 2/2011 | Shanbhag et al. | 340/932.2 |
| 7,894,631 | B2* | 2/2011 | Kakinami | 382/103 |
| 8,059,864 | B2* | 11/2011 | Huang et al. | 382/103 |
| 8,077,965 | B2* | 12/2011 | Kakinami et al. | 382/154 |
| 8,130,120 | B2* | 3/2012 | Kawabata et al. | 340/908 |

(Continued)

FOREIGN PATENT DOCUMENTS

| | | | |
|---|---|---|---|
| JP | 09067954 A | * | 3/1997 |
| JP | 2001202596 A | * | 7/2001 |
| JP | 2007140606 A | * | 6/2007 |
| JP | 2011168258 A | * | 9/2011 |

OTHER PUBLICATIONS

Tsai et al.; "Vehicle Detection using Normalized Color and Edge Map"; Mar. 2007; IEEE Transactions on Image Processing, vol. 16, No. 3; pp. 850-864.*

(Continued)

*Primary Examiner* — John Villecco

(57) ABSTRACT

The present invention discloses a method for detecting parked vehicles based on edge detection. For each parking space, its boundary comprises an exposed edge, which is not occluded by any parked vehicle. Its primary detected edges are the detected edges that are substantially parallel to the exposed edge. A parking space is detected as occupied if its primary detected edges satisfy at least one of these conditions: (1) their total number is more than a pre-determined minimum number; and/or, (2) their total length is more than a pre-determined minimum length.

20 Claims, 5 Drawing Sheets

(56) References Cited

U.S. PATENT DOCUMENTS

| | | | |
|---|---|---|---|
| 8,134,479 B2* | 3/2012 | Suhr et al. | 340/932.2 |
| 8,139,115 B2 | 3/2012 | Barnes et al. | |
| 8,269,616 B2* | 9/2012 | Uehara | 340/435 |
| 8,698,652 B1* | 4/2014 | Zhang | 340/932.2 |
| 8,704,680 B1* | 4/2014 | Zhang | 340/932.2 |
| 8,737,690 B2* | 5/2014 | Bulan et al. | 382/104 |
| 8,744,132 B2* | 6/2014 | Bulan et al. | 382/104 |
| 8,817,100 B2* | 8/2014 | Nerayoff et al. | 348/148 |
| 8,830,322 B2* | 9/2014 | Nerayoff et al. | 348/148 |
| 8,830,323 B1* | 9/2014 | Nerayoff et al. | 348/148 |
| 8,836,788 B2* | 9/2014 | Nerayoff et al. | 348/148 |
| 2004/0015290 A1* | 1/2004 | Curbow et al. | 701/117 |
| 2005/0002544 A1* | 1/2005 | Winter et al. | 382/104 |
| 2005/0083212 A1* | 4/2005 | Chew | 340/932.2 |
| 2006/0220911 A1* | 10/2006 | Jaupitre et al. | 340/932.2 |
| 2008/0101656 A1* | 5/2008 | Barnes et al. | 382/104 |
| 2008/0137940 A1* | 6/2008 | Kakinami et al. | 382/154 |
| 2008/0165030 A1* | 7/2008 | Kuo et al. | 340/932.2 |
| 2013/0021171 A1* | 1/2013 | Hsu et al. | 340/932.2 |
| 2013/0113936 A1* | 5/2013 | Cohen et al. | 348/148 |
| 2013/0258107 A1* | 10/2013 | Delibaltov et al. | 348/148 |
| 2013/0265423 A1* | 10/2013 | Bernal et al. | 348/148 |
| 2013/0266185 A1* | 10/2013 | Bulan et al. | 382/104 |
| 2013/0266187 A1* | 10/2013 | Bulan et al. | 382/104 |
| 2013/0266188 A1* | 10/2013 | Bulan et al. | 382/104 |
| 2014/0105464 A1* | 4/2014 | Park et al. | 382/104 |
| 2014/0153776 A1* | 6/2014 | Takeuchi | 382/103 |
| 2014/0257943 A1* | 9/2014 | Nerayoff et al. | 705/13 |
| 2014/0266803 A1* | 9/2014 | Bulan et al. | 340/932.2 |
| 2014/0270381 A1* | 9/2014 | Wu et al. | 382/104 |

OTHER PUBLICATIONS

Chen et al.; "Vision-Based Vehicle Surveillance and Parking Lot Management using Multiple Cameras"; 2010 Sixth International Conference on Intelligent Information Hiding and Multimedia Signal Procesing; Oct. 15-17, 2010; pp. 631-634.*

Choeychuen, K.; "Available car parking space detection from webcam by using adaptive mixing measures"; Jun. 1, 2012; 2012 International Joint Conference on Computer Science and Software Engineering (JCSSE); pp. 12-16.*

Liu et al.; "A multi-classifier image based vacant parking detection system"; Dec. 8-11, 2013; 2013 IEEE 20th International Conference on Electronics, Circuits, and Systems (ICECS); pp. 933-936.*

* cited by examiner

PARKED VEHICLE DETECTION BASED ON EDGE DETECTION

CROSS-REFERENCE TO RELATED APPLICATIONS

This application claims priority of a first provisional application entitled "Occluded Vehicle Detection", Ser. No. 61/883,122, filed Sep. 26, 2013; and a second provisional application entitled "Inline Parked Vehicle Detection", Ser. No. 61/889,004, filed Oct. 9, 2013.

BACKGROUND

1. Technical Field of the Invention

The present invention relates to the field of electronics, and more particularly to a method to detect parked vehicles.

2. Prior Arts

Locating a vacant parking space causes much frustration to motorists. It increases fuel consumption and has a negative impact to the environment. To conserve energy resources and enhance the quality of the environment, it is highly desired to develop a parking-monitoring system, which can transmit substantially real-time parking occupancy data to motorists. Based on the parking occupancy data, a motorist can be guided towards a vacant parking space at destination.

Parking enforcement is an important aspect of city management. The current parking-enforcement system is patrol-based, i.e. parking enforcement officers patrol the streets and/or parking lots to enforce the parking regulations. This operation requires significant amount of man power and also consumes a lot of fuel. It is highly desired to take advantage of the above-mentioned parking-monitoring system and automatically measure the parking time for each monitored parking space.

Both parking monitoring and enforcement are based on the detection of parked vehicles (i.e. parking detection). Because it can monitor a large number of parking spaces simultaneously, a camera is an ideal device for parking detection. Prior arts disclose many camera-based parking-monitoring systems. Bernal et al. (U.S. Patent App. Pub. No. 2013/0265423 A1) disclosed a parking-monitoring system using a background-subtraction algorithm. A parking space is detected as occupied if there is substantial difference between a presently captured image and a background image (i.e. the image of the parking space when it is vacant) within the region of interest (ROI). For each parking space, its ROI is a region in its image that is processed for parking detection.

Background-subtraction algorithm is sensitive to the viewing angle of the camera. When the viewing angle of the camera is small (i.e. the camera is mounted low above the ground), erroneous results may be obtained. FIG. 1A discloses an example. This parking area comprises four parking spaces A1-A4. The image 50 of the parking space A2 is a parallelogram "abcd" (points "c", "d" not shown). It is substantially occluded by a front-parked vehicle 40a (a vehicle parked immediately in front of the parking space A2, i.e. in the parking space A1). The background-subtraction algorithm will erroneously detect the parking space A2 as occupied.

Background-subtraction algorithm is also sensitive to shadows. When a shadow is cast over a parking space, erroneous results may be obtained. FIG. 1B discloses an example. Suppose the background image was taken when there is no shadow in a parking space A2. At the time of parking detection, a shadow 55 is cast over the parking space A2. The background-subtraction algorithm will erroneously detect the parking space A2 as occupied. Besides viewing angle and shadows, the background-subtraction algorithm is also sensitive to lighting variations and surface conditions of the parking space. A change in lighting (e.g. from a sunny day to a cloudy day) may cause erroneous detection. In addition, a wet, snowy or leafy surface may also cause erroneous detection. In sum, the background-subtraction algorithm is not robust.

OBJECTS AND ADVANTAGES

It is a principle object of the present invention to conserve energy resources and enhance the quality of the environment.

It is a further object of the present invention to provide a robust parking-detection method.

It is a further object of the present invention to provide a parking-detection method insensitive to viewing angle, shadow, lighting variations and surface conditions.

In accordance with these and other objects of the present invention, the present invention discloses a parking-detection method based on edge detection.

SUMMARY OF THE INVENTION

The present invention discloses a parking-detection method based on edge detection. A parking-monitoring camera captures an image of a parking area including a plurality of parking spaces. In the image of each parking space, its boundary comprises an exposed edge (which is not occluded by any parked vehicles) and a secondary edge (which might be occluded by a parked vehicle and is not parallel to the exposed edge). A processor processes the captured image and uses an edge-detection algorithm to detect edges within the ROI associated with each parking space. Among all detected edges, the primary detected edges are selected from those that are substantially parallel to the exposed edge of the parking space of interest. A parking space is detected as occupied if its primary detected edges satisfy a first condition: (1) the total number of the primary detected edges is more than a first pre-determined minimum number; and/or, (2) the total length of the primary detected edges is more than a first pre-determined minimum length. In the present invention, the primary detected edges are also referred to as signature edges of a vehicle, as they indicate the presence of a vehicle.

On the other hand, a parking space is detected as vacant if the secondary detected edges satisfy a second condition: (1) the total number of the secondary detected edges is more than a second pre-determined minimum number; and/or, (2) the total length of the secondary detected edges is more than a second pre-determined minimum length. Here, the secondary detected edges are selected from the detected edges that are substantially parallel to the secondary edge of the parking space of interest.

Compared with the background-subtraction algorithm, the preferred edge-detection algorithm is more robust. It is insensitive to occlusion, shadow, lighting variations and surface conditions. Note that, in order to lessen the computational burden of image processing, the preferred edge-detection algorithm only detects signature edges of the parked vehicles, not the shapes of the parked vehicles.

Figure 1A:
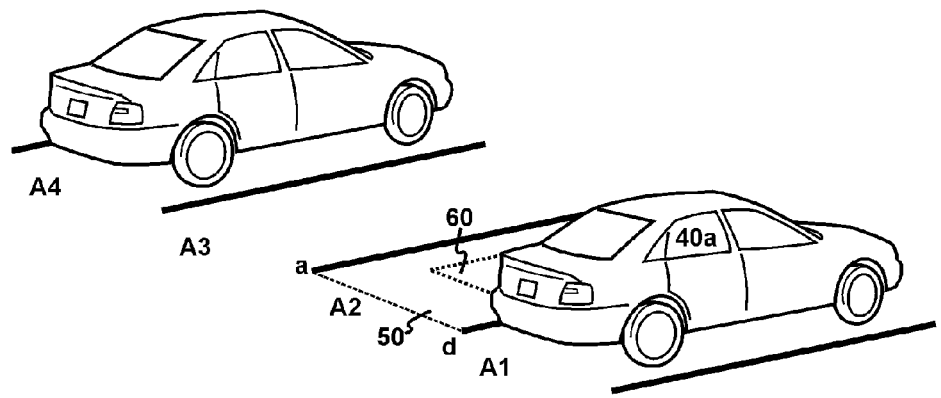
FIG. 1A is an image of a parking area where a parking space is occluded by a front-parked vehicle (prior art)

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

Figure 2A:
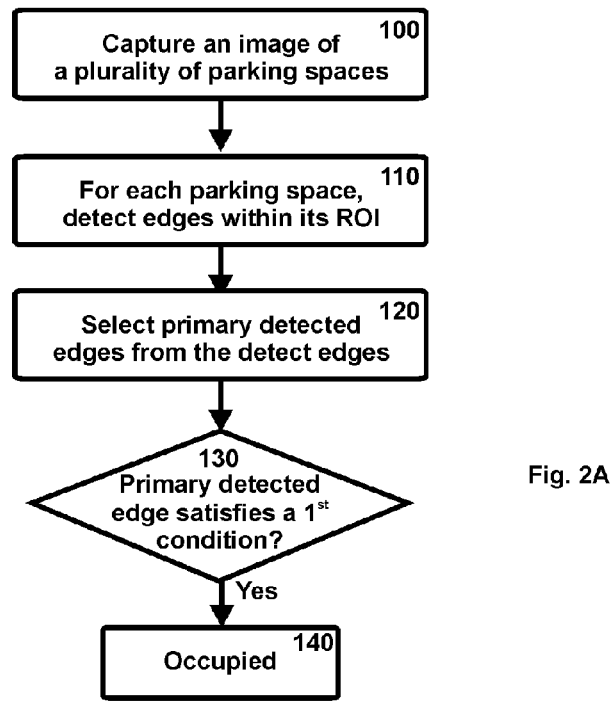
FIG. 2A is a flow chart showing preferred steps to detect an occupied parking space using a preferred edge-detection algorithm.
Figure 2B:
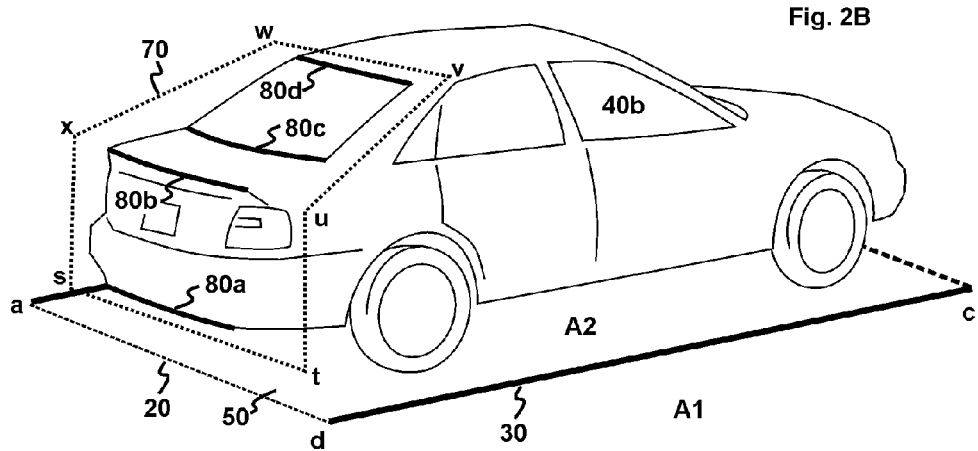
FIG. 2B illustrates the primary detected edges within an ROI associated with an occupied parking space (side-by-side parking)

Referring now to FIGS. 2A-2B, FIG. 2A discloses a flow chart showing preferred steps to detect a parking space A2 which is occupied by a vehicle 40b; FIG. 2B illustrates the primary detected edges 80a-80d within its ROI 70. In this example, the vehicles (40b . . . ) parked in the parking spaces A1-A4 are parked in parallel, i.e. side-by-side parking.

Figure 1B:
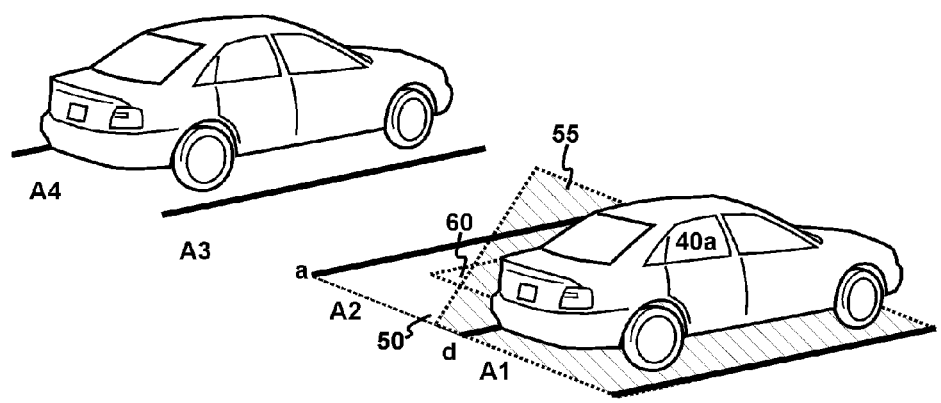
FIG. 1B is an image of a parking area where a shadow is cast over a parking space (prior art)

During parking detection, a parking-monitoring camera captures an image of a parking area including a plurality of parking spaces A1, A2 (step 100). In the image 50 of each parking space (e.g. A2), its boundary comprises an exposed edge 20 (line "ad") and at least a secondary edge 30 (line "cd"). The exposed edge 20 is not occluded by any parked vehicles (as shown in FIGS. 1A-1B), while the secondary edge 30 might be occluded by a parked vehicle (e.g. 40a of FIG. 1A) and is not parallel to the exposed edge 20. A processor processes the captured image and uses an edge-detection algorithm to detect edges within the ROI 70 associated with the parking space A2 (step 110). Among these detected edges, the primary detected edges 80a-80d are selected from those that are substantially parallel to the exposed edge 20 (step 120). These primary detected edges 80a-80d are also referred to as the signature edges of the detected vehicle 40b. They correspond to the bottom edge of the rear bumper, the protruded edge of the trunk, the bottom edge of the rear window, and the top edge of the rear window of the detected vehicle 40b, respectively. If the primary detected edges 80a-80d satisfy a first condition (step 130), the parking space A2 is detected as occupied (step 140). The first condition could be any or a combination of: (1) the total number of the primary detected edges is more than a first pre-determined minimum number; (2) the total length of the primary detected edges is more than a first pre-determined minimum length.

In FIG. 2B, the ROI 70 associated with the parking space A2 is designed in such a way that the occlusion of a front-parked vehicle (e.g. 40a of FIG. 1A) does not interfere with the vehicle detection for the parking space A2. Here, a front-parked vehicle is a vehicle parked immediately in front of the parking space of interest from the perspective of the camera. In this example, the ROI 70 takes a hexagonal shape "stu-vwx". It is formed by scanning at least a portion of the exposed edge 20 upward and then side-way.

Figure 3A:
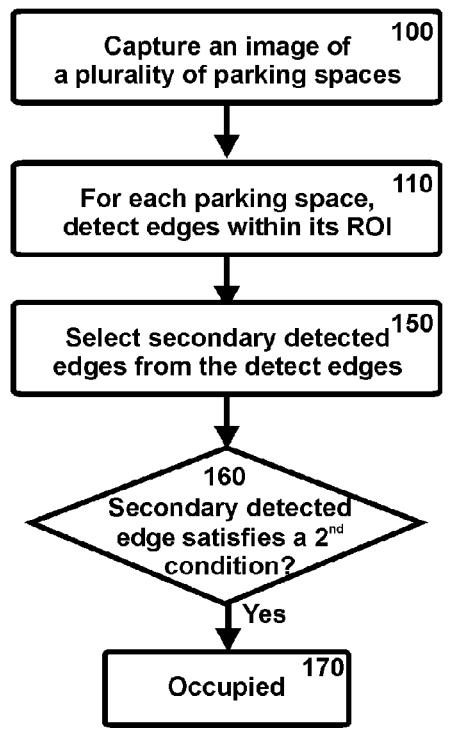
FIG. 3A is a flow chart showing preferred steps to detect a vacant parking space using a preferred edge-detection algorithm.
Figure 3B:
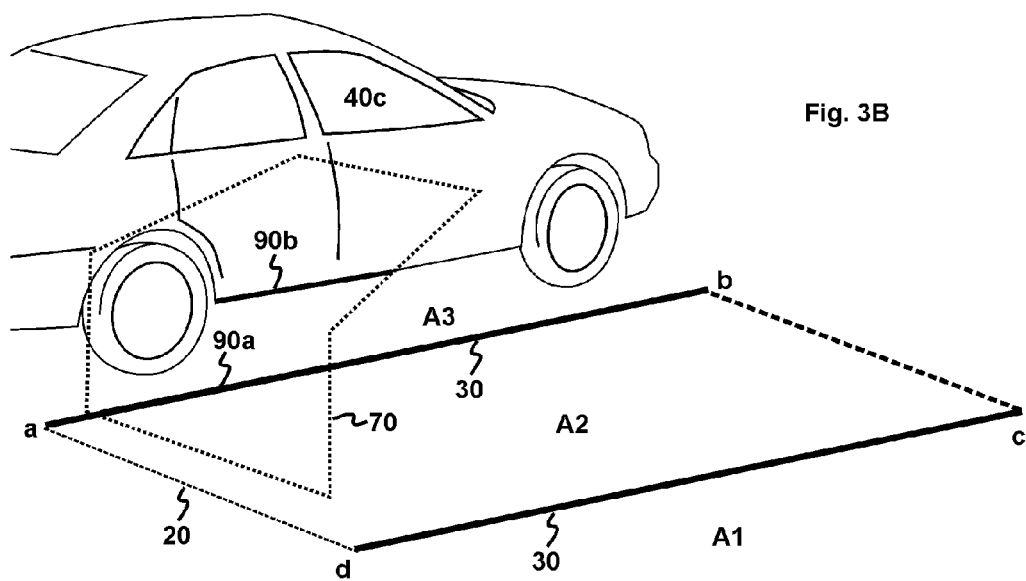
FIG. 3B illustrates the secondary detected edges within an ROI associated with a vacant parking space (side-by-side parking)

Referring now to FIGS. 3A-3B, FIG. 3A discloses a flow chart showing preferred steps to detect a vacant parking space A2; FIG. 3B illustrates the secondary detected edges 90a-90b within its ROI 70. Among the detected edges, the secondary detected edges 90a-90b are selected from the detected edges that are substantially parallel to the secondary edge 30 (step 150). They correspond to the line "ab" separating the parking spaces A2/A3, the bottom edge of the body of a back-parked vehicle 40c, respectively. Here, a back-parked vehicle is a vehicle parked immediately behind the parking space of interest from the perspective of the camera. If the secondary detected edges 90a-90b satisfy a second condition (step 160), the parking space A2 is vacant (step 170). The second condition could be any or a combination of: (1) the total number of the secondary detected edges is more than a second pre-determined minimum number; (2) the total length of the secondary detected edges is more than a second pre-determined minimum length.

Figure 4A:
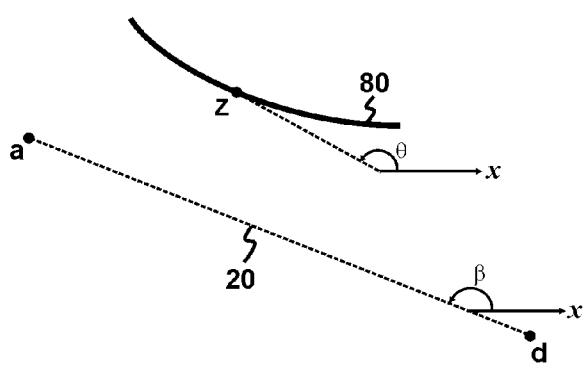
FIGS. 4A-4C explain the term "substantially parallel" in details.
Figure 4B:
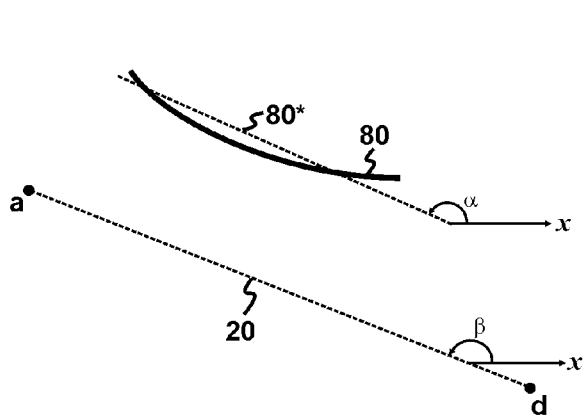
Figure 4C:
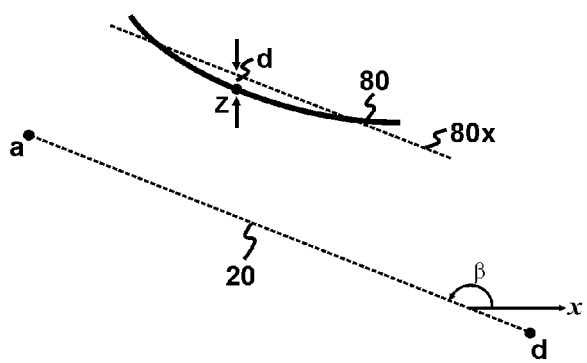

Referring now to FIGS. 4A-4C, the term "substantially parallel" is further explained. This term is commonly used in the definition of primary detected edges and secondary detected edges. In a first preferred definition of FIG. 4A, a curve 80 is substantially parallel to a line 20 if the tangential angle θ at any given pixel Z along the curve 80 is within a pre-determined range from the directional angle β of the line 20. In a second preferred definition of FIG. 4B, a curve 80 is substantially parallel to a line 20 if the directional angle α of the best-fit line 80* to the curve 80 is within another pre-determined range from the directional angle β of the line 20. In a third preferred definition of FIG. 4C, a curve 80 is substantially parallel to a line 20 if a shifted line 80x can be found which is parallel to the line 20 and any pixel Z along the curve 80 is within a pre-determined distance to the shifted line 80x. Here, the angles (including tangential angle and directional angle) are measured with respect to the +x axis in these figures. It should be apparent to those skilled in the art that, besides the above three definitions, other definition may also be used.

Figure 5:
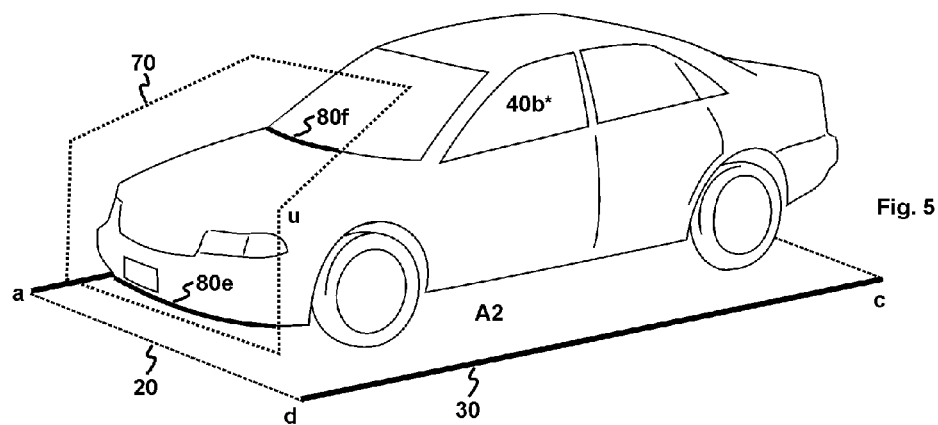
FIG. 5 illustrates the primary detected edges for a tail-in-first vehicle (side-by-side parking)

Referring now to FIG. 5, the primary detected edges for a tail-in-first vehicle are disclosed. Like that in FIG. 2B, the vehicle 40b* is parked side-by-side with other vehicles in the parking spaces A1-A4. However, instead of being parked head-in-first, it is parked tail-in-first, i.e. the vehicle's head is towards the exposed edge 20. Within the ROI 70, the primary detected edges 80e, 80f correspond to the bottom edge of the front bumper and the bottom edge of the front window of the vehicle 40b*. These primary detected edges 80e, 80f are also the signature edges of the detected vehicle 40b*.

Figure 6A:
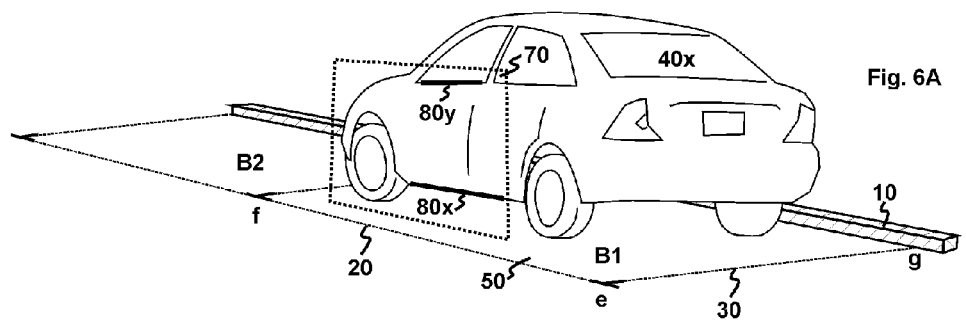
FIG. 6A illustrates the primary detected edges within an ROI associated with an occupied parking space (series parking)

Besides side-by-side parking (FIGS. 2B, 3B and 5), the preferred edge-detection algorithm can be used to detect series-parked vehicles, which are parked one after another in succession. Most street parking is series parking. FIG. 6A illustrates an example. In this example, the vehicles (40x . . . ) parked in the parking spaces B1, B2 are parked in series along a curb 10. The parking space B2 is occupied by a vehicle 40x and its boundary comprises an exposed edge 20

(line "ef") and a secondary edge 30 (line "eg"). The ROI 70 associated with the parking space B2 is formed by scanning at least a portion of the exposed edge 20 upward. Within the ROI 70, the primary detected edges 80x, 80y are signature edges of the detected vehicle 40x. They correspond to the bottom edge of the body and the bottom edge of the side window of the detected vehicle 40x. Similar to FIG. 2B, the parking space B1 is detected as occupied if the primary detected edges 80x, 80y satisfy a first condition: (1) the total number of the primary detected edges is more than a first pre-determined minimum number; and/or, (2) the total length of the primary detected edges is more than a first pre-determined minimum length.

Figure 6B:
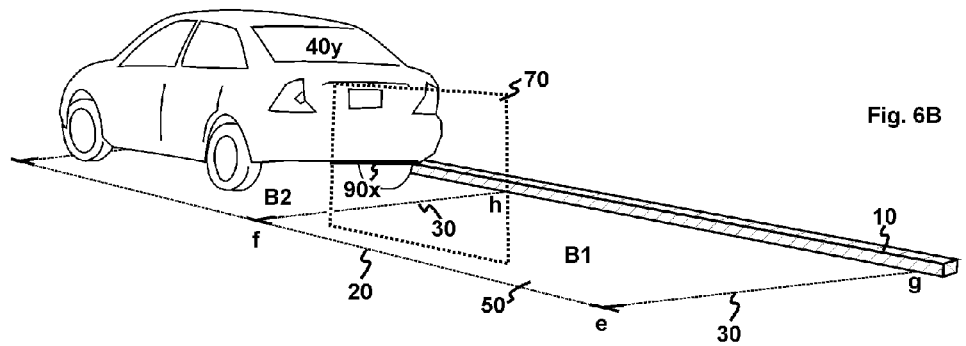
FIG. 6B illustrates the secondary detected edges within an ROI associated with a vacant parking space (series parking).

FIG. 6B illustrates the secondary detected edges 90x within an ROI 70 when the parking space B1 is vacant. Note that a back-parked vehicle 40y may interfere with the vehicle detection for the parking space B1. Within the ROI 70, the secondary detected edge 90x correspond to the bottom edge of the body of the back-parked vehicle 40y. Similar to FIG. 3B, the parking space B1 is detected as vacant if the secondary detected edges 90x satisfy a second condition: (1) the total number of the secondary detected edges is more than a second pre-determined minimum number; and/or, (2) the total length of the secondary detected edges is more than a second pre-determined minimum length.

While illustrative embodiments have been shown and described, it would be apparent to those skilled in the art that may more modifications than that have been mentioned above are possible without departing from the inventive concepts set forth therein. The invention, therefore, is not to be limited except in the spirit of the appended claims.

What is claimed is:

1. A method for detecting parked vehicles, comprising the steps of:
   capturing an image of a plurality of parking spaces, the boundary of each parking space comprising an exposed edge, wherein said exposed edge is not occluded by any parked vehicles;
   detecting edges within a region of interest (ROI) associated with each parking space, wherein a substantial portion of said ROI is formed by scanning at least a portion of said exposed edge upward;
   selecting primary detected edges from detected edges for each parking space, wherein said primary detected edges are substantially parallel to the exposed edge of each parking space;
   determining the parking state of each parking space, wherein a parking space is detected as occupied if the primary detected edges for said parking space satisfy a first pre-determined condition.

2. The method according to claim 1, wherein said first pre-determined condition is that the total number of said primary detected edges is more than a first pre-determined minimum number.

3. The method according to claim 1, wherein said first pre-determined condition is that the total length of said primary detected edges is more than a first pre-determined minimum length.

4. The method according to claim 1, wherein the tangential angles along each of said primary detected edges are within a first pre-determined range from the directional angle of said exposed edge.

5. The method according to claim 1, wherein the directional angle of the best-fit line for each of said primary detected edges is within a second pre-determined range from the directional angle of said exposed edge.

6. The method according to claim 1, wherein each pixel on each of said primary detected edges is within a first pre-determined distance from a shifted line parallel to said exposed edge.

7. The method according to claim 1, wherein:
   the boundary of each parking space comprises at least a secondary edge, wherein said secondary edge is not parallel to said exposed edge;
   a parking space is detected as vacant if the secondary detected edges for said parking space satisfy a second pre-determined condition, wherein said secondary detected edges are substantially parallel to the secondary edge of said parking space.

8. The method according to claim 1, wherein vehicles in said plurality of parking spaces are parked in parallel.

9. The method according to claim 8, wherein each of said primary detected edges is at least a portion of an edge of a rear part of a vehicle.

10. The method according to claim 8, wherein each of said primary detected edges is at least a portion of an edge of a front part of a vehicle.

11. The method according to claim 1, wherein vehicles in said plurality of parking spaces are parked in series.

12. The method according to claim 11, wherein each of said primary detected edges is at least a portion of an edge of a side part of a vehicle.

13. A method for detecting parked vehicles, comprising the steps of:
   capturing an image of a plurality of parking spaces, the boundary of each parking space comprising an exposed edge and a secondary edge, wherein said exposed edge is not occluded by any parked vehicles, and said secondary edge is not parallel to said exposed edge;
   detecting edges within a region of interest (ROI) associated with each parking space, wherein a substantial portion of said ROI is formed by scanning at least a portion of said exposed edge upward;
   selecting secondary detected edges from detected edges for each parking space, wherein said secondary detected edges are substantially parallel to the secondary edge of each parking space;
   determining the parking state of each parking space, wherein a parking spaces is detected as vacant if the secondary detected edges for said parking space satisfy a second pre-determined condition.

14. The method according to claim 13, wherein said second pre-determined condition is that the total number of said secondary detected edges is more than a second pre-determined minimum number.

15. The method according to claim 13, wherein said second pre-determined condition is that the total length of said secondary detected edges is more than a second pre-determined minimum length.

16. The method according to claim 13, wherein the tangential angles along each of said secondary detected edges are within a third pre-determined range from the directional angle of said secondary edge.

17. The method according to claim 13, wherein the directional angle of the best-fit line for each of said secondary detected edges is within a fourth pre-determined range from the directional angle of said secondary edge.

18. The method according to claim 13, wherein each pixel on each of said secondary detected edges is within a second pre-determined distance from a shifted line parallel to said secondary edge.

19. The method according to claim 13, wherein a parking space is detected as occupied if the primary detected edges for said parking space satisfy a first pre-determined condition, said primary detected edges being substantially parallel to the exposed edge of said parking space.

20. The method according to claim 13, wherein vehicles in said plurality of parking spaces are parked in parallel or in series.

* * * * *